United States Patent
Brandwine et al.

(10) Patent No.: US 9,882,773 B2
(45) Date of Patent: *Jan. 30, 2018

(54) VIRTUAL RESOURCE PROVIDER WITH VIRTUAL CONTROL PLANES

(71) Applicant: Amazon Technologies, Inc., Reno, NV (US)

(72) Inventors: Eric Jason Brandwine, Haymarket, VA (US); Marvin M. Theimer, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 661 days.

This patent is subject to a terminal disclaimer.

(21) Appl. No.: 14/195,379

(22) Filed: Mar. 3, 2014

(65) Prior Publication Data
US 2014/0181278 A1 Jun. 26, 2014

Related U.S. Application Data

(63) Continuation of application No. 12/980,893, filed on Dec. 29, 2010, now Pat. No. 8,667,495.

(51) Int. Cl.
*G06F 9/455* (2006.01)
*G06F 9/46* (2006.01)
(Continued)

(52) U.S. Cl.
CPC ........ *H04L 41/0806* (2013.01); *G06F 9/5061* (2013.01); *H04L 41/5054* (2013.01); *H04L 41/5096* (2013.01)

(58) Field of Classification Search
None
See application file for complete search history.

(56) References Cited

U.S. PATENT DOCUMENTS 7,694,303 B2   4/2010   Hahn et al.
7,761,875 B2   7/2010   Karamanolis et al.
(Continued)

OTHER PUBLICATIONS

Barham et al., "Xen and the Art of Virtualization," SOSP '03: Proceedings of the Nineteenth ACM Systems Principles, pp. 164-177 (Oct. 2003).

(Continued)

*Primary Examiner* — Bing Zhao
(74) *Attorney, Agent, or Firm* — Klarquist Sparkman, LLP

(57) ABSTRACT

Control planes of virtual resource providers may be customized in a secure, stable and efficient manner with virtual control planes. Control planes may be modularized. Control plane modules may be supplied with data from standardized sensors, and required to generate standardized resource configuration requests responsive to solicitations with specified response latencies. Custom control plane modules may be selected to replace or complement default control plane modules. Financial and computational costs associated with control plane modules may be tracked. Competing resource configurations may be mediated by a control plane supervisor. Such mediation may be based on control plane module reputation scores. Reputation scores may be based on customer feedback ratings and/or measured performance with respect to module goals. Mediated configuration parameter values may be based on a combination of competing configuration parameter values weighted according to reputation. Contribution of individual modules to goal achievement may be tracked and rewarded accordingly.

19 Claims, 8 Drawing Sheets

(51) Int. Cl.
  *G06F 15/173* (2006.01)
  *H04L 12/24* (2006.01)
  *G06F 9/50* (2006.01)

(56) References Cited

U.S. PATENT DOCUMENTS

| | | | |
|---|---|---|---|
| 8,140,371 B2 | 3/2012 | Franz et al. | |
| 8,234,650 B1 | 7/2012 | Eppstein et al. | |
| 8,276,147 B2 | 9/2012 | Messmer et al. | |
| 8,364,802 B1 | 1/2013 | Keagy et al. | |
| 8,433,801 B1 | 4/2013 | Yemini et al. | |
| 8,434,088 B2 | 4/2013 | Banerjee et al. | |
| 8,464,255 B2 | 6/2013 | Nathuji et al. | |
| 8,468,535 B1 | 6/2013 | Keagy et al. | |
| 8,504,689 B2 | 8/2013 | Ferris et al. | |
| 8,539,078 B2 | 9/2013 | Duan et al. | |
| 8,549,281 B2 | 10/2013 | Samovskiy et al. | |
| 8,570,861 B1 | 10/2013 | Brandwine et al. | |
| 2003/0037092 A1* | 2/2003 | McCarthy | G06F 9/5061 718/104 |
| 2004/0039759 A1 | 2/2004 | Detlefs et al. | |
| 2005/0268302 A1 | 12/2005 | Geib et al. | |
| 2006/0149842 A1 | 7/2006 | Dawson et al. | |
| 2006/0294238 A1 | 12/2006 | Naik et al. | |
| 2007/0028237 A1 | 2/2007 | Bulson et al. | |
| 2007/0064711 A1 | 3/2007 | Wang et al. | |
| 2007/0079308 A1 | 4/2007 | Chiaramonte et al. | |
| 2007/0250837 A1 | 10/2007 | Herington et al. | |
| 2008/0016198 A1 | 1/2008 | Johnston-Watt et al. | |
| 2008/0046610 A1 | 2/2008 | Tripathi et al. | |
| 2008/0222717 A1 | 9/2008 | Rothstein et al. | |
| 2008/0307259 A1 | 12/2008 | Vasudevan et al. | |
| 2009/0044024 A1 | 2/2009 | Oberheide et al. | |
| 2009/0077550 A1 | 3/2009 | Rhine | |
| 2009/0204470 A1 | 8/2009 | Weyl et al. | |
| 2009/0204471 A1 | 8/2009 | Elenbaas et al. | |
| 2009/0276771 A1 | 11/2009 | Nickolov et al. | |
| 2009/0300720 A1 | 12/2009 | Guo et al. | |
| 2010/0070970 A1 | 3/2010 | Hu et al. | |
| 2010/0250748 A1 | 9/2010 | Sivasubramanian et al. | |
| 2010/0306767 A1 | 12/2010 | Dehaan | |
| 2011/0055396 A1 | 3/2011 | Dehaan | |
| 2011/0153697 A1 | 6/2011 | Nickolov et al. | |
| 2011/0185063 A1 | 7/2011 | Head et al. | |
| 2011/0185064 A1 | 7/2011 | Head et al. | |
| 2011/0276951 A1 | 11/2011 | Jain | |
| 2011/0296000 A1 | 12/2011 | Ferris et al. | |
| 2011/0320606 A1 | 12/2011 | Madduri et al. | |
| 2012/0084113 A1 | 4/2012 | Brandwine et al. | |
| 2012/0084443 A1 | 4/2012 | Theimer et al. | |
| 2012/0116937 A1 | 5/2012 | Van Biljon et al. | |
| 2012/0151474 A1 | 6/2012 | Biran et al. | |
| 2012/0151476 A1 | 6/2012 | Vincent | |
| 2012/0159483 A1 | 6/2012 | He et al. | |
| 2012/0233329 A1 | 9/2012 | Dickinson et al. | |
| 2013/0060839 A1 | 3/2013 | Van Biljon et al. | |
| 2013/0066923 A1 | 3/2013 | Sivasubramanian et al. | |
| 2015/0156135 A1 | 6/2015 | Brandwine et al. | |

OTHER PUBLICATIONS

Foster et al., "The Anatomy of the Grid: Enabling Scalable Virtual Organizations," [online], 2001 [retrieved on May 30, 2012]. Retrieved from the Internet: <URL:.globus.org/alliance/publications/papers/anatomy.pdf>.

Foster et al., "Globus: A Metacomputing Infrastructure Toolkit," International Journal of High Performance Computing Applications, vol. 11, No. 2, pp. 115-128 (Jun. 1997).

Foster et al., "The Physiology of the Grid: An Open Grid Services Architecture for Distributed Systems Integration," [online], 2002 [retrieved on May 30, 2012]. Retrieved from the Internet: <.globus.org/alliance/publications/papers/ogsa.pdf.

Wowza Media Server NewsFlash, "Wowza Media Systems Named Streaming Media Magazine's 2007 Editors' Pick," Feb. 1, 2007, 4 pages.

\* cited by examiner

VIRTUAL RESOURCE PROVIDER WITH VIRTUAL CONTROL PLANES

BACKGROUND

This is a Continuation of U.S. patent application Ser. No. 12/980,893, filed Dec. 29, 2010 (now U.S. Pat. No. 8,667,495, issued Mar. 4, 2014), which application is hereby incorporated by reference.

BACKGROUND

It has become common for individuals and organizations to use networked computers to perform and assist with a wide variety of tasks. Rather than own and maintain physical computer hardware and a suitable data networking environment, it is becoming more and more common to provision virtual computer systems and other virtual computing resources at a specialized provider of such virtual resources. Use of virtual computing resources can provide a number of advantages including cost advantages and/or ability to adapt rapidly to changing computing resource needs. However, conventional virtual resource providers have a number of shortcomings.

In many ways, virtual computing resources emulate their physical counterparts, and virtual resource providers ultimately implement provisioned virtual resources with various sets of physical computing hardware and other implementation resources. Virtual resource providers may differ in how implementation resources are allocated to virtual resources, as well as with respect to ongoing allocation management, and the various virtual resource management amenities that are made available to users. Virtual resource providers typically enforce an independence between provisioned virtual resources and the underlying implementation resources, since this allows for sophisticated allocation management strategies that can, for example, yield low virtual resource failure rates and high cost efficiency. This can be an advantage from a user perspective since management of physical computing hardware and other such implementation resources can be complex and expensive. However, sophisticated users may find some aspects of virtual resource provider behavior non-optimal.

Unfortunately for such users, conventional virtual resource providers typically provide limited customization options in this respect. Enabling customization of virtual resource provider behavior for some users without compromising service to other users is challenging. Modern virtual resource provider control systems are sufficiently complex that even well intentioned customizations can have problematic unintended consequences.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
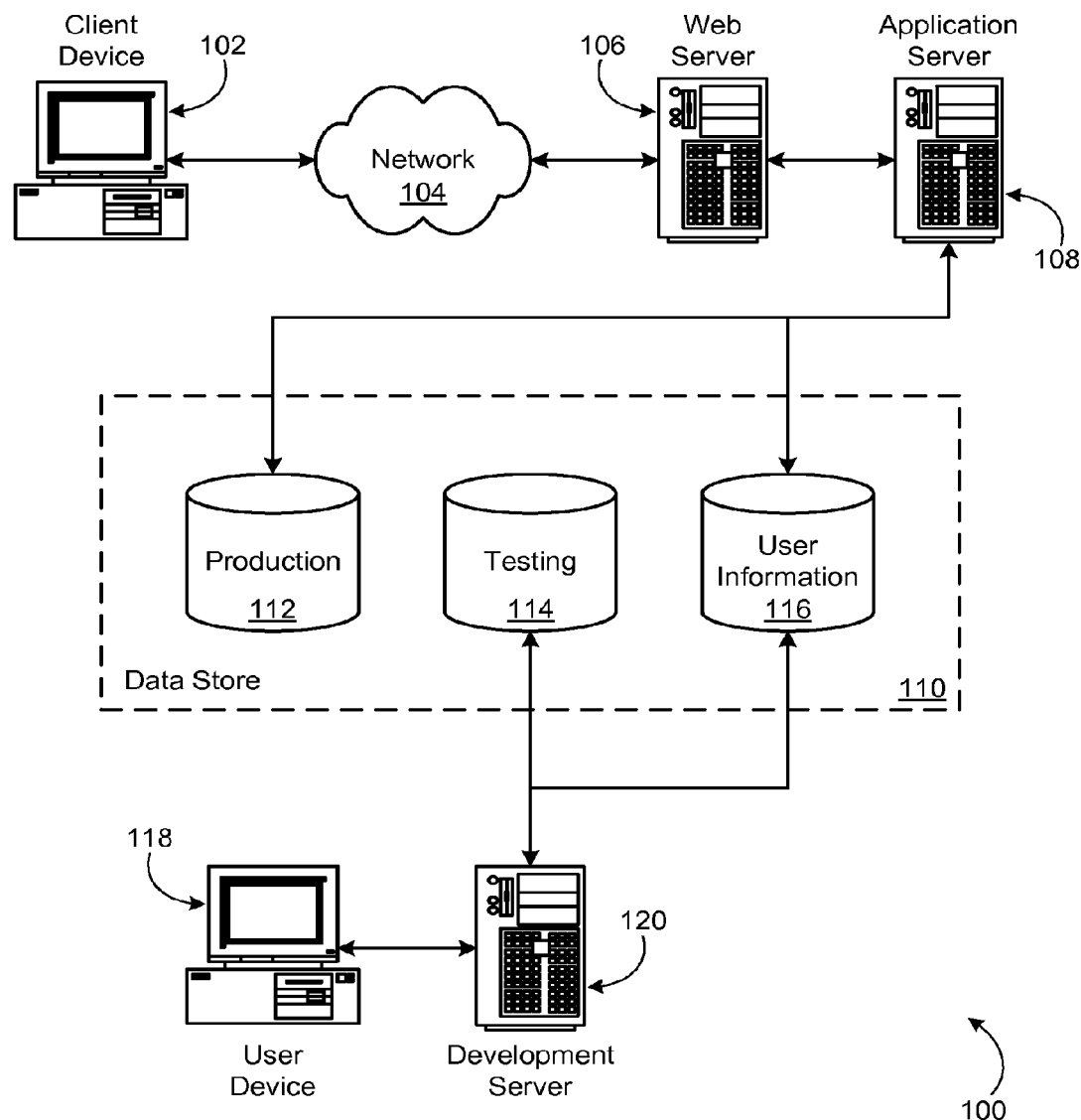
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Virtual resources such as virtual computer systems and virtual data stores provisioned at a virtual resource provider emulate their physical counterparts and may be comparably configurable and customizable. A virtual resource provider may engage in many different virtual resource management activities such as allocation and re-allocation of implementation resources (e.g., physical servers, datacenters, networking resources, power, cooling) to virtual resources, virtual resource monitoring and optimization, automatic scaling of groups of virtual resources in response to changing demand and other virtual resource load balancing, detection and mitigation of malicious network traffic, and detection and mitigation of unsolicited electronic messages. Such management activities, in contrast to the provisioned virtual resources themselves, are said to occur in a control plane of the virtual resource provider. In at least one embodiment, the control plane of the virtual resource provider may be customized for a particular customer in a secure, stable and efficient manner by instantiating a virtual control plane for the customer.

Virtual control planes may be enabled by modularizing various aspects of the virtual resource provider control plane. That is, standard inputs available to such modules from a set of control plane sensors (i.e., data sources) may be specified, as well as expected outputs and response latencies. Custom control plane modules may be selected by users to replace or complement a set of default control plane modules in a virtual control plane. Costs (computational and financial) incurred by custom control plane module actions may be tracked and charged to customers and/or vendors as a moderating mechanism (e.g., to avoid starving some customers of implementation resources at the expense of others). In addition, custom control plane modules, along with default control plane modules, may be moderated by a set of control plane components configured to constrain individual resource configuration requests and mediate competing resource configuration requests.

A reputation score may be associated with such control plane modules. For example, the reputation score may be based on customer feedback with respect to the module's perceived efficacy in achieving its goals. Alternatively, or in addition, a module's reputation score may be based at least in part on metrics such as response latency, and resource utilization efficiency relative to goal achievement. When competing resource configuration requests are received from different control plane modules and/or virtual control planes, the competition may be resolved in favor of the control plane module having an optimal reputation score. For example, the module associated with the more optimal reputation score may be given outright precedence, a configuration parameter value may be set to a reputation-weighted combination of requested values, and/or a contested resource capacity may be allocated based at least in part on reputation score.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment. The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
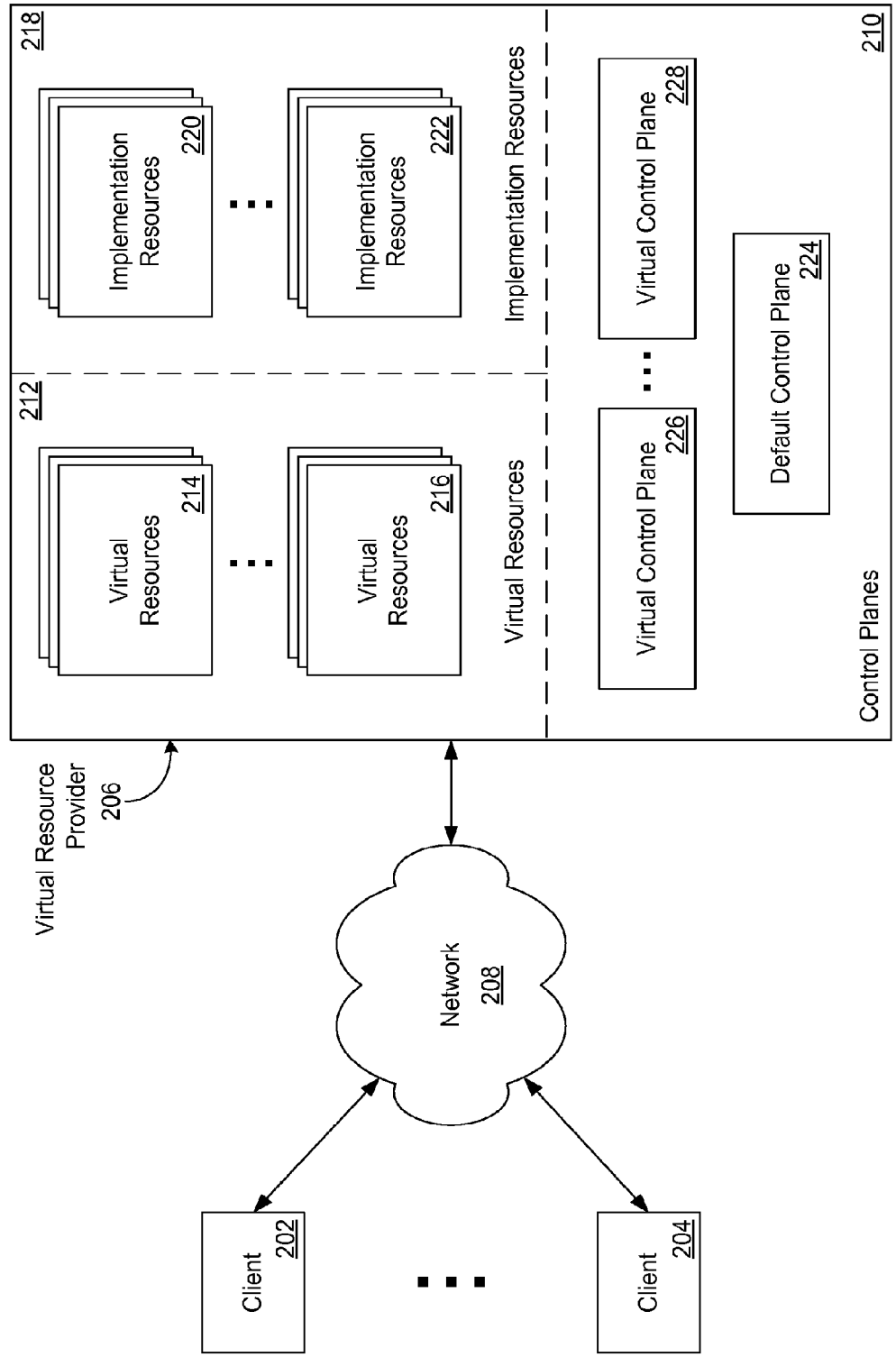
FIG. 2 is a schematic diagram depicting aspects of an example virtual resource provisioning architecture in accordance with at least one embodiment.

In at least one embodiment, one or more aspects of the environment 100 may incorporate and/or be incorporated into a virtual resource provisioning architecture. FIG. 2 depicts aspects of an example virtual resource provisioning architecture 200 in accordance with at least one embodiment. The example virtual resource provisioning architecture 200 includes multiple clients 202-204 communicatively connected to a virtual resource provider 206 over a network 208. For example, the clients 202-204 may corresponding to computing devices such as the computing device 102 of FIG. 1 and/or client programs incorporated into such computing devices. The ellipsis between the client 202 and the client 204 indicates that the virtual resource provisioning architecture 200 may include any suitable number of clients although, for clarity, only two are shown in FIG. 2. Ellipses are used similarly throughout the drawings.

One or more of the clients 202-204 may be utilized by one or more customers of the virtual resource provider 206 to interact with a control plane 210 of the virtual resource provider 206, and thereby provision one or more virtual resources 212. Alternatively, or in addition, one or more of the clients 202-204 may be utilized (not necessarily by virtual resource provider 206 customers) to interact with provisioned virtual resources 212. The provisioned virtual resources 212 may include any suitable type and/or number of virtual resources 214-216. Examples of suitable virtual resources 212 include virtual machines such as virtual computer systems (VCSs), virtual networks, virtual private networks (VPNs), virtual network connections, virtual data stores, virtual file system volumes, specialized data processing agents, media streaming agents including audio and video streaming agents, message queues, publish-subscribe topics configured to notify subscribers having subscriptions that match events published to the publish-subscribe topics, monitoring agents, load balancing agents, and suitable combinations thereof.

The virtual resource provider 206 may include any suitable type and/or number of implementation resources 220-222. Each of the virtual resources 214-216 may be implemented by a set of the implementation resources 218. In at least one embodiment, various implementation resources of the implementation resources 218 may be configured to participate in implementing, at least in part, multiple virtual resources of the virtual resources 212. Examples of suitable implementation resources 220-222 include VCS servers, data store servers, computers, server racks, networking hardware including switches, routers, gateways, bridges, hubs, repeaters, firewalls, malicious network traffic mitigation devices and wireless transceivers, power supplies, generators, data centers, rooms in data centers, mobile data centers, as well as non-volatile storage devices including hard drives, processing units such as central processing units (CPUs), caches in processing units, processing cores in multi-core processing units, volatile storage devices such as memory modules including random access memory (RAM) modules, and RAM chips of multi-chip memory modules, network interface hardware and suitable combinations thereof.

The virtual resource provider 206 may maintain multiple control planes 210 including a default control plane 224 and one or more virtual control planes 226-228. The control planes 210 may process virtual resource provisioning requests, manage allocation of virtual resources 212 to implementation resources 218 and/or manage allocation of implementation resources 218 to virtual resources 212. An example control plane supervisor capable of maintaining multiple control planes in accordance with at least one embodiment is described below in more detail with reference to FIG. 4.

Figure 3:
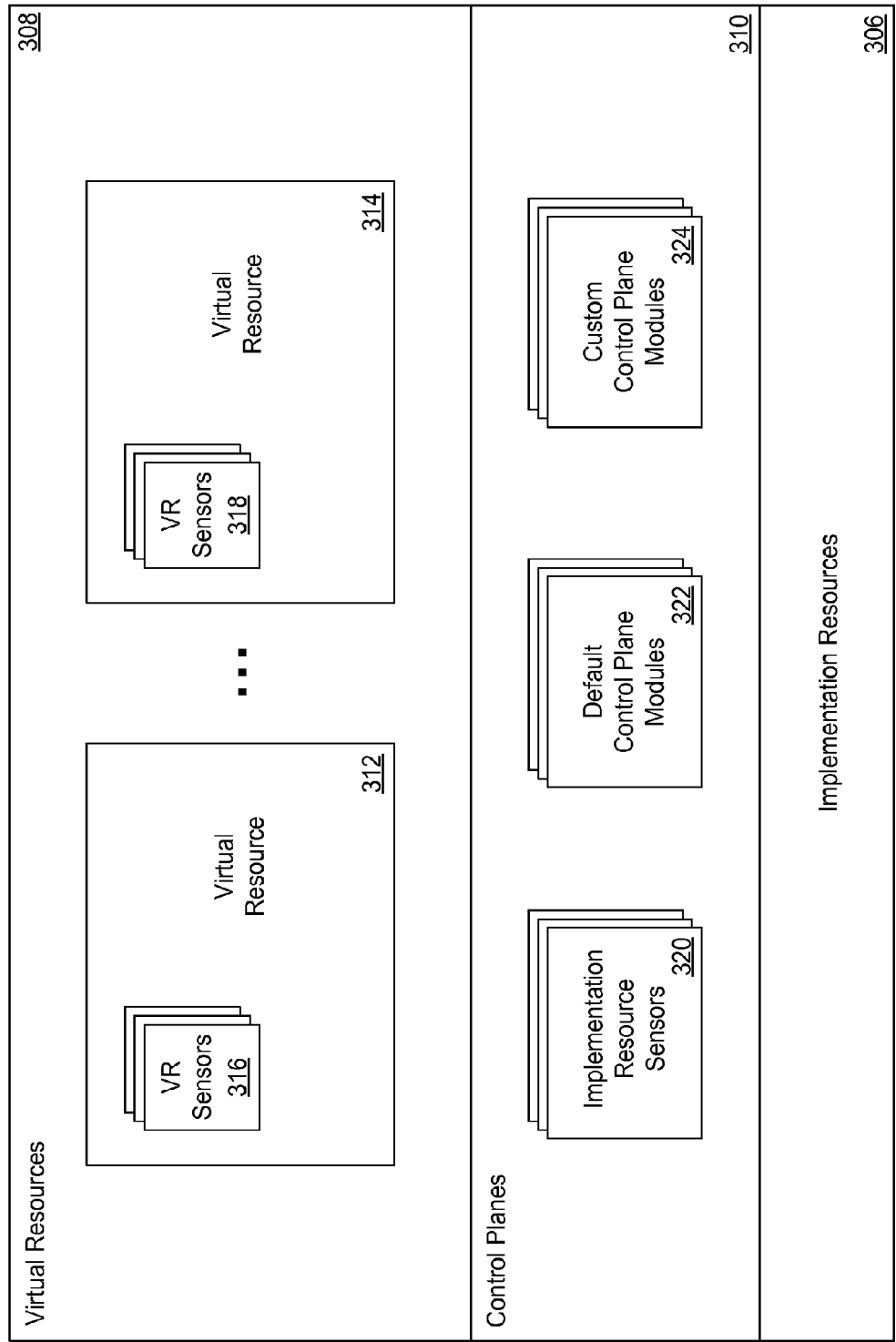
FIG. 3 is a schematic diagram depicting aspects of an example virtual resource provider in accordance with at least one embodiment.

In at least one embodiment, the virtual resources 212 are at least partially isolated from the implementation resources 218. For example, programmatic objects maintained by the virtual resources 212 may not have direct access to implementation resource 218 interfaces, but instead work through interfaces of a virtualization layer. Such virtualization mechanisms are known to those of skill in the art and need not be described in detail here. Alternatively, or in addition, the virtual resources 212 may be opaque to the control planes 210. For example, the control planes 210 may be able to provision virtual computer systems, but not normally examine the programmatic and/or data objects maintained by the virtual computer systems. These isolations and/or encapsulations can provide a number of advantages to both customers and operators of the virtual resource provider 206, some of which are described above. In at least one embodiment, virtual control planes 226-228 incorporating custom control plane modules breach such isolations in a manner that enables maintenance of the advantages. FIG. 3 depicts an example virtual resource provider 300 with control planes 310 incorporating custom control plane modules 324 in accordance with at least one embodiment.

The virtual resource provider 300 of FIG. 3 is an example of the virtual resource provider 206 of FIG. 2. The implementation resources 306, virtual resources 308 and control planes 310 of FIG. 3 are examples of the implementation resources 218, virtual resources 212 and control planes 210 of FIG. 2, respectively. The virtual resources 312-314 of FIG. 3 may correspond to one or more types of the virtual resources 214-216 of FIG. 2. The control planes 310 include a set of default control plane modules 322 and may include a set of one or more custom control plane modules 324. For example, the default control plane 224 of FIG. 2 may incorporate and/or be at least partially implemented with the set of default control plane modules 322. The virtual control planes 226-228 of FIG. 2 may incorporate and/or be at least partially implemented with a set of control plane modules that includes at least a subset of the default control plane modules 322 and/or one or more of the custom control plane modules 324. For example, a particular virtual control plane 226 may incorporate one or more of the custom control plane modules 324 to replace one or more of the default control plane modules 322. Alternatively, or in addition, the virtual control plane 226 may incorporate one or more of the custom control plane modules 324 to complement and/or compete with one or more of the default control plane modules 322.

The control plane modules 322-324 may correspond to any suitable set of control plane 224-228 functionality.

Example control plane modules 322-324 include virtual resource provisioning modules configured at least to provision one or more types of virtual resource, implementation resource 306 allocation modules configured at least to allocate implementation resources 306 to virtual resources 308 and/or vice versa, virtual resource capacity auto-scaling modules configured at least to automatically adjust a capacity of one or more virtual resources 308 responsive to user demand, virtual resource spread management modules configured at least to reduce clustering of particular sets and/or types of virtual resources 308 with respect to implementation resources 306 and thus susceptibility of the sets and/or types to hardware failure events, service load balancing modules configured at least to seek an even distribution of service demand load across an available set of virtual resources 308, anomalous and/or malicious network traffic detection modules configured at least to detect such network traffic, anomalous and/or malicious network traffic mitigation management modules configured at least to mitigate such network traffic, unsolicited electronic message filtering modules configured at least to filter such electronic messages, and any suitable set of control plane 224-228 functionality. The default control plane modules 322 are examples of replaceable control plane modules. The default control plane 224 may include control plane modules that are not replaceable (not shown in FIG. 3).

Each control plane module 322-324 may be configured to accept a particular set of input data provided by a set of virtual resource provider 300 sensors (i.e., data sources), and to generate a particular set of output data, tasks, jobs, actions and/or workflows. The control planes 310 may incorporate one or more implementation resource sensors 320 configured at least to provide data characterizing one or more of the implementation resources 306 in a standardized format. Examples of the implementation resource sensors 320 include implementation resource status sensors configured at least to provide data with respect to a status of one or more of the implementation resources 310 (e.g., resource "alive", resource "listening" for incoming messages, time since last response), and implementation resource capacity utilization sensors configured at least to provide data with respect to a capacity utilization of one or more of the implementation resources 310 (e.g., CPU utilization, memory utilization, operating system resource utilization, network bandwidth utilization, full data or sampled).

In addition, control plane modules 322-324 may be configured to accept input from virtual resource sensors 316-318 incorporated into the virtual resources 312-314. Such virtual resource sensors 316-318 may be voluntarily hosted (i.e., maintained and/or operated) by the virtual resources 312-314 in order to provide enhanced data to the control plane modules 322-324. For example, the virtual resource sensors 316-318 may include virtual resource status sensors configured at least to provide data with respect to a status of the virtual resource and/or one or more of the components thereof, and virtual resource capacity utilization sensors configured at least to provide data with respect to a capacity utilization of the virtual resource and/or one or more of the components thereof. Virtual resources 312-314 may at least partially implement one or more computing applications provider one or more services to users, and the virtual resource sensors 316-318 may further provide data with respect to such computing applications. For example, the virtual resource sensors 316-318 may provide access to application logs, application archives, application histories, application-level protocols, as well as summaries and statistics thereof. Some custom control plane modules 324 may provide and/or be associated with a set of custom implementation resource 320 and/or virtual resource sensors 316-318.

Figure 4:
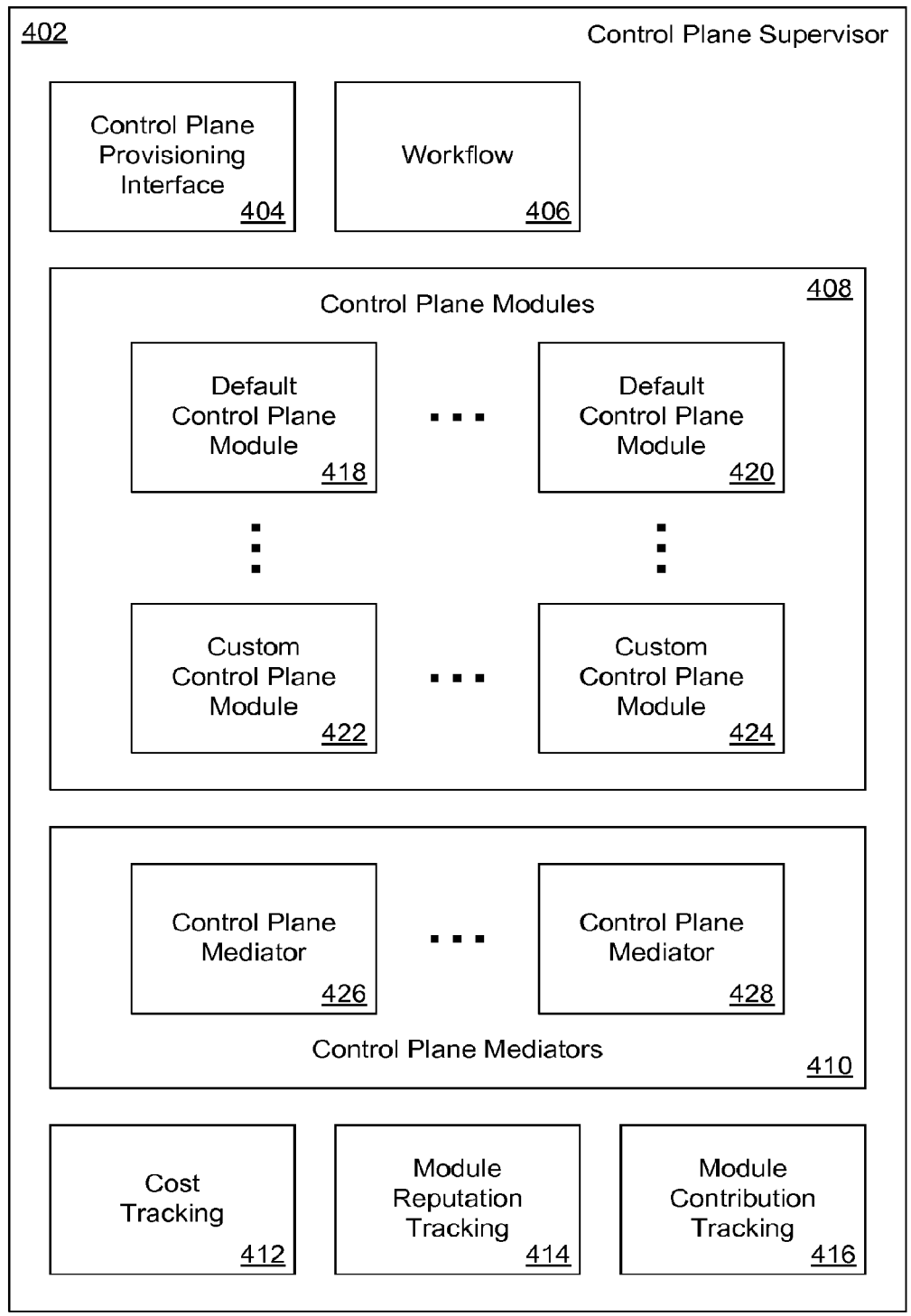
FIG. 4 is a schematic diagram depicting aspects of an example virtual resource provider control plane in accordance with at least one embodiment.

FIG. 4 depicts aspects of an example control plane supervisor 402 in accordance with at least one embodiment. The control plane supervisor 402 may include a control plane provisioning interface 404 configured at least to receive virtual control plane 226-228 (FIG. 2) provisioning, configuration, re-configuration, and de-provisioning (collectively, "provisioning") requests from one or more of the clients 202-204, a workflow component 406 configured at least to guide responses to requests in accordance with one or more workflows.

The control plane provisioning interface 404 may include any suitable provisioning interface elements. Examples of suitable provisioning interface elements include interface elements that correspond to requests to provision the virtual control planes 226-228 (FIG. 2), interface elements that provide access to virtual control plane 226-228 configuration information, and one or more interface elements enabling authentication to establish authority for such provisioning-related operations. The control plane provisioning interface 404 may incorporate and/or be incorporated in a user interface (UI) such as a graphical user interface (GUI), a Web-based interface, a programmatic interface such as an application programming interface (API) and/or a set of remote procedure calls (RPCs) corresponding to provisioning interface elements, a messaging interface such as a messaging interface in which the interface elements of the control plane provisioning interface 404 correspond to messages of a communication protocol, and/or any suitable combination thereof.

In at least one embodiment, the control plane provisioning interface 404 may create, and/or cause the workflow component 406 to create, one or more workflows that are then maintained by the workflow component 406. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the resource allocation component 408.

The workflow component 406 may modify, further specify and/or further configure established workflows. For example, the workflow component 406 may select particular implementation resources 218 (FIG. 2) of the virtual resource provider 206 to execute and/or be assigned to particular tasks. Such selection may be based at least in part on the computing resource needs of the particular task as assessed by the workflow component 406. As another example, the workflow component 406 may add additional and/or duplicate tasks to an established workflow and/or reconfigure information flow between tasks in the established workflow. Such modification of established workflows may be based at least in part on an execution efficiency analysis by the workflow component 406. For example, some tasks may be efficiently performed in parallel, while other tasks depend on the successful completion of previous tasks.

An authorized user may select a set of control plane modules 408 with which to provision one of the virtual control planes 226-228 (FIG. 2). The default control plane modules 418-420 of FIG. 4 are examples of the default control plane modules 322 of FIG. 3. Each default control plane module 418 may have one or more corresponding custom control plane modules 422-424 capable of replacing the default control plane module 418-420. The custom control plane modules 422-424 may also include additional functionality not provided by one or more of the default control plane modules 418-420.

The control plane supervisor 402 may further include a set of control plane mediators 410. The control plane mediators 410 may include one or more control plane mediators 426-428 for each type of control plane module 408. For example, suppose the default control plane module 418 and the custom control plane module 422 provide virtual resource auto-scaling functionality, the control plane mediator 426 may be configured to mediate resource configuration requests related to virtual resource auto-scaling. Sets of control plane modules (default and/or custom) of the same type may make resource configuration requests specifying competing configurations. Control plane mediators 410 may mediate competing configurations, for example, decide between incompatible configurations, mediate configuration parameter values (e.g., determine an intermediate parameter value with respect to competing requests), and/or mediate resource capacity allocations. Mediation of resource configuration requests is described below in more detail with reference to FIG. 5.

To assist control plane module mediation, the control plane supervisor 402 may include a module reputation tracking component 414 configured at least to maintain reputation scores corresponding to control plane modules 408. Such reputation scores may be based at least in part on one or more metrics that measure performance with respect to a set of goals of corresponding control plane modules 408. For example, the metrics may include customer feedback with respect to performance and/or resource utilization efficiency to achieve the set of goals. Examples of control plane module goals include a target rate of inability to service due to insufficient virtual resource capacity, a target rate of idle virtual resource capacity, target densities of instances of particular types of virtual resource, target variance in load between members of a service set, false positive rates of anomalous and/or malicious network traffic detection, false negative rates of anomalous and/or malicious network traffic detection, a target rate of anomalous and/or malicious network traffic following mitigation, false positive rates of unsolicited electronic message detection, false negative unsolicited electronic message detection, response time (e.g., following solicitation of a resource configuration request by the control plane supervisor 402), and goals corresponding to control plane module functionality.

The control plane supervisor 402 may include a module contribution tracking component 416 configured at least to track individual control plane module 408 contribution to goal achievement, and a cost tracking component 412 configured at least to track costs associated with module goal achievement. Such costs may be computational and/or financial, and may be charged to an account associated with a customer utilizing a particular control plane module and/or a vendor of the control plane module. Module reputation may be based at least in part on module contribution. Alternatively, or in addition, fees and/or rewards may be allocated to control plane module vendors based at least in part on module contribution.

Figure 5:
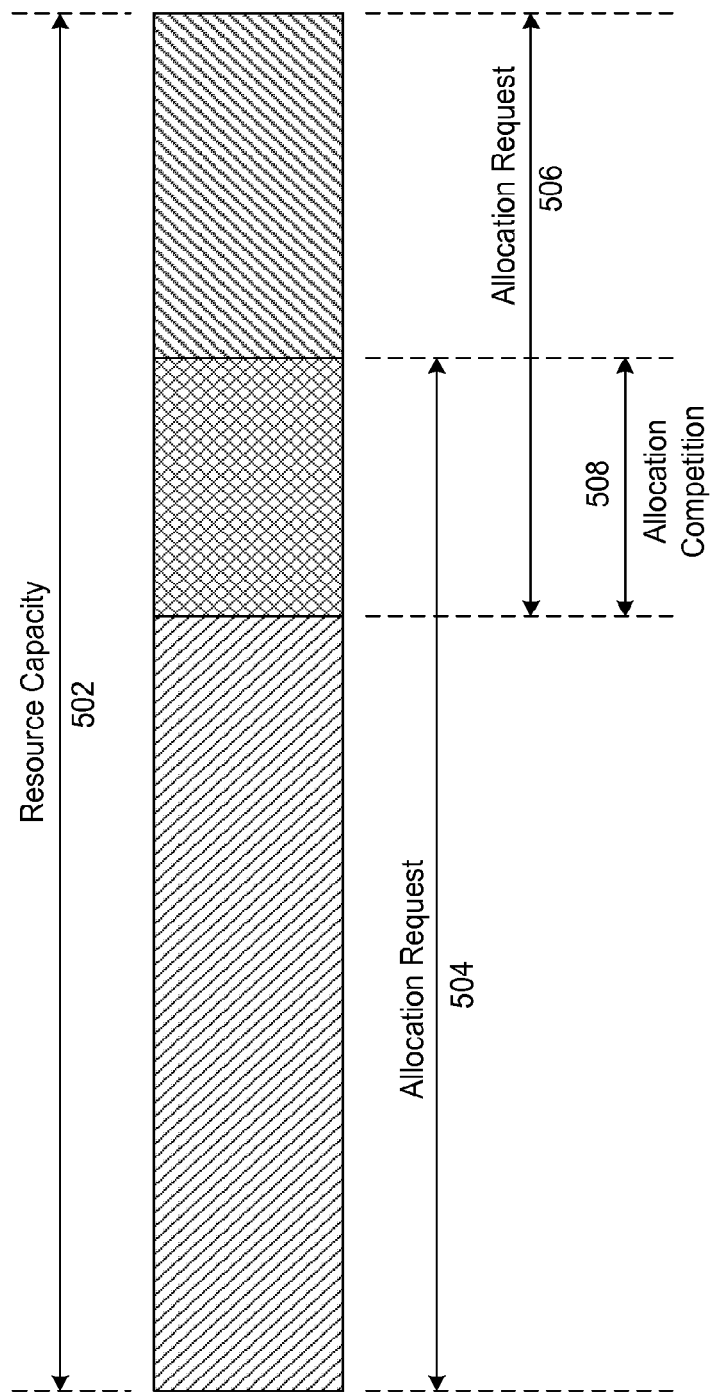
FIG. 5 is a schematic diagram depicting aspects of example competing resource capacity allocations in accordance with at least one embodiment.

Control plane mediators 410 may determine mediated resource configurations based at least in part on competing resource configurations specified by multiple control plane modules 408 (utilized by a single virtual control plane 226 or multiple control planes 224-228) and on corresponding reputations of the multiple control plane modules 408. Mediators 410 may select between competing configurations based on more optimal (e.g., highest) reputation, combine competing configuration parameter values with weights corresponding to reputation, and/or allocate requested resource capacities in accordance with control plane module reputation. Mediators 410 may respond dynamically to changes in reputation and other factors influencing configuration mediation. FIG. 5 depicts example competing resource allocation requests in accordance with at least one embodiment.

A particular resource (e.g., one of the virtual resources 308 or implementation resources 306 of FIG. 3) has a resource capacity 502. For example, a particular network connection may have a bandwidth which it cannot exceed. A first allocation request 504 may compete with a second allocation request 506 to an extent indicated by the overlap 508. The control plane mediator 426 (FIG. 4) configured to mediate competing requests of this type may determine mediated allocations, for example, based on the reputation of the requesting control plane modules. As one example, the second allocation request 506 may be reduced until it no longer competes with the first allocation request 504. In this case, the first allocation request 504 may be associated with a control plane module 418 having a higher reputation than the control plane module 422 that generated the second allocation request 506.

As an alternate example, the first and second allocation requests 504, 506 may both be reduced until they no longer compete. For example, the allocation requests 504, 506 may be reduced and/or set as a function of the reputations of the control plane modules 418, 422 that generated them. Such functions may include weighted sums such as sums with weights normalized to prevent the sum exceeding the resource capacity 502. Such weights may incorporate a random variation to enhance collection of performance data related to low reputation modules, for example, where a bias towards high reputation modules makes this difficult. More generally, resource allocations may be determined with any suitable optimization technique given a suitable objective or cost function. Examples of suitable optimization techniques include greedy hill climbing from multiple diverse initial points, simulated annealing and suitable genetic optimization algorithms.

A particular mediation may be with respect to a single party or multiple parties. For example, multiple control plane modules 408 (FIG. 4) may generate competing resource configuration requests associated with a set of resources managed by a single customer of the virtual resource provider 206 (FIG. 2). In this case, the control plane mediator 426 may select from among the competing resource configuration requests. The control plane mediator 426 may differently select between competing resource configuration requests from competing control plane modules 408 under different conditions. For example, the control plane mediator 426 may select a custom auto-scaling module when competing resource configuration requests specify an increase in the size of a set of virtual resources, but a default auto-scaling module when competing resource configuration requests specify a decrease in the size of the set of virtual resources.

As another example, multiple control plane modules 408 (FIG. 4) may generate competing resource configuration requests associated with a set of resources available to multiple customers of the virtual resource provider 206 (FIG. 2). In this case, the control plane mediator 426 may give due consideration to each of the competing resource configuration requests weighted by reputation and/or other suitable factors. For example, suppose multiple customers of the virtual resource provider 206 are being affected by anomalous and/or malicious network traffic (e.g., a denial of service attack). The appropriate control plane module for each customer, some default, some custom, may send a resource configuration request specifying competing configurations for limited mitigation resources. The control plane mediator 426 may allocate the limited mitigation resources in accordance with the allocations requested by the competing configurations as modified by corresponding module reputation. Large resource requests by low reputation modules may result in a low allocation, while relatively large resource requests by high reputation modules may result in the requested allocation.

Figure 6:
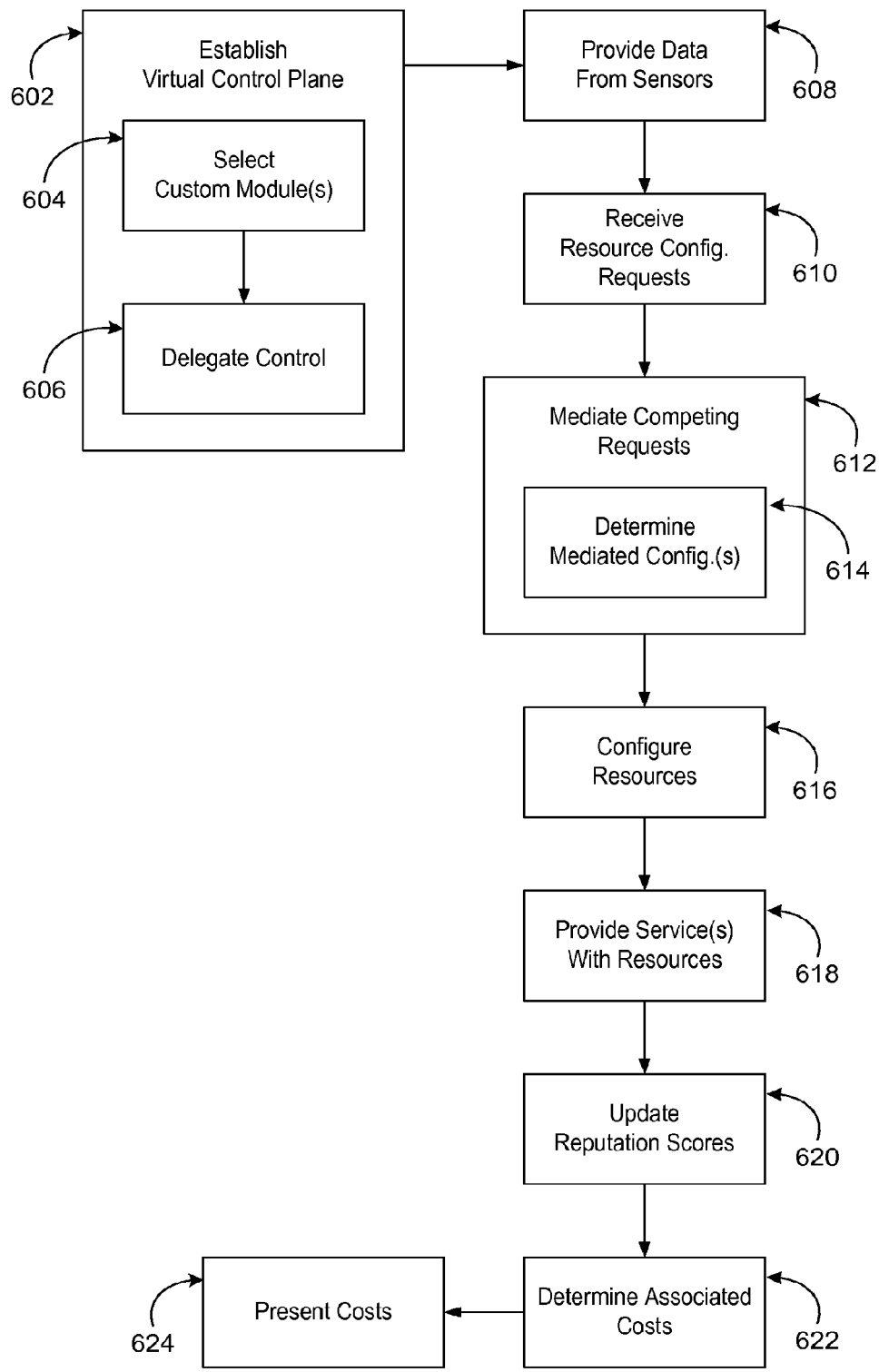
FIG. 6 is a flowchart depicting example steps for operating virtual resources in accordance with at least one embodiment.

FIG. 6 depicts example steps for operating virtual resources in accordance with at least one embodiment, and in particular with virtual control planes. At step 602, a virtual control plane may be established. For example, an authorized user may interact with the control plane provisioning interface 404 (FIG. 4) to provision the virtual control plane 226. Establishing the virtual control plane 226 may include multiple steps. For example, the authorized user may select one or more of the custom control plane modules 422-424 to be utilized by the virtual control plane 226 (at step 604). Custom control plane modules 422-424 may override or compete with corresponding default control plane modules 418-420 or other custom control plane modules 422-424. For example, provisioning the virtual control plane 226 may include delegating control plane functionality from one or more default control plane modules 418-420 to corresponding custom control plane modules 422-424 (at step 606).

At step 608, data may be provided from one or more sensors. For example, data may be provided from one or more implementation resource sensors 320 (FIG. 3) and/or one or more virtual resource sensors 316-318 to the virtual control plane 226 (FIG. 2) established at step 602. At step 610, one or more resource configuration requests may be received. For example, responsive to the data provided at step 608, multiple competing resource configuration requests may be received from the default control plane 224 and/or one or more virtual control planes 226-228. At step 612, competing requests may be mediated. For example, one or more of the control plane mediators 426-428 may determine one or more mediated configurations (at step 614), for example, based at least in part on the resource configurations specified by the competing resource configuration requests. As described above with reference to FIG. 4 and FIG. 5, such mediated configurations may furthermore be based at least in part on reputation scores associated with the control plane modules 408 that generated the resource configuration requests. At step 616, one or more virtual and/or implementation resources targeted by the resource configuration request(s) may be configured, for example, with the mediated configuration(s) determined at step 614.

At step 618, one or more services may be provided with a set of virtual and/or implementation resources including the resources configured at step 616. For example, the set of resources may collectively implement a Web application as described above with reference to FIG. 1, and the service may be provided to one or more users by the Web application. At step 620, one or more reputation scores may be updated. For example, the module reputation tracking component 414 may update reputation scores for active control plane modules 408 based at least in part on performance metrics resulting from the configurations determined at step 614. At step 622, one or more costs associated with the virtual control plane may be determined, for example, as described below in more detail with reference to FIG. 8. At step 624, the costs determined at step 622 may be presented to an authorized user. For example, the user may view a cost statement at a graphical user interface of the virtual control plane.

Figure 7:
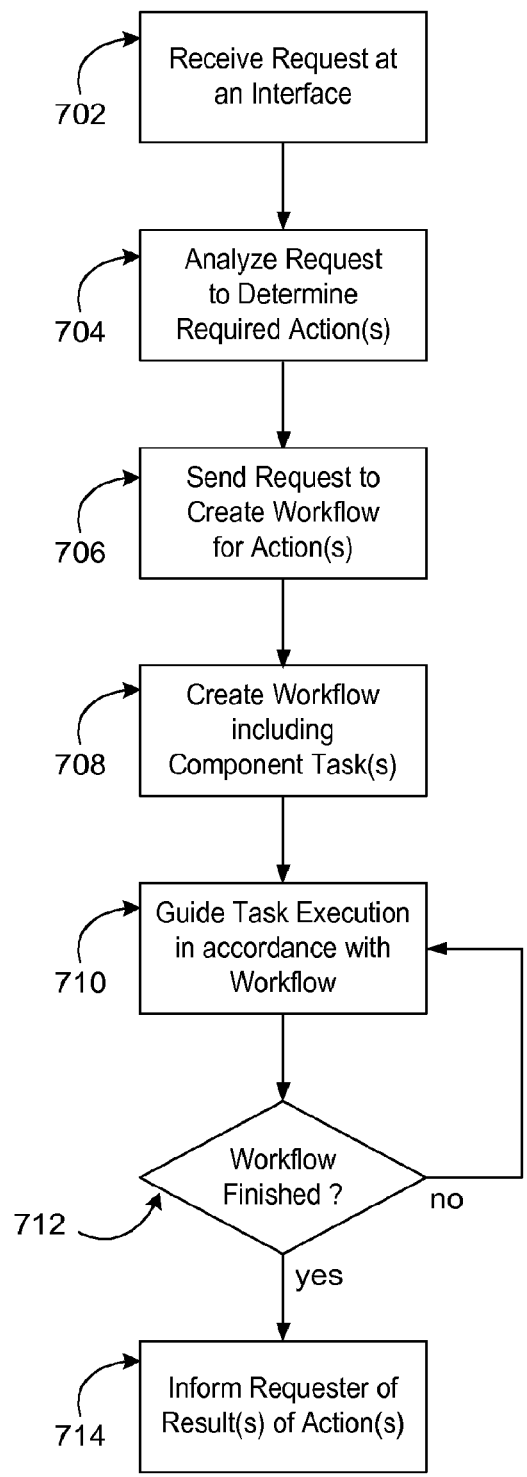
FIG. 7 is a flowchart depicting example steps for workflow management in accordance with at least one embodiment.

Each of the control planes 210 (FIG. 2) and the control plane supervisor 402 (FIG. 4) may be facilitated by one or more workflows maintained by the workflow component 406. FIG. 7 depicts example steps for workflow management in accordance with at least one embodiment. At step 702, a request may be received by an interface of one of the control planes 210 and/or the control plane supervisor 402. For example, one of the user interfaces of the virtual control plane 226 may receive the request from a user, customer and/or administrator of the virtual resource provider 206. The request may be a call to a programmatic interface such as an application programming interface (API) or a Web services interface, e.g., utilizing a Simple Object Access Protocol (SOAP) call. Alternatively, or in addition, the request may be received through a graphical user interface (GUI) such as a Web-based GUI. At step 704, the request may be analyzed to determine one or more actions required to successfully complete the request. For example, the control plane provisioning interface 404 may analyze the request, and determine a set of actions required to provision a virtual control plane 226-228. When an interface element receiving the request corresponds to a specific action to be performed, the interface may extract information from the request to be utilized in determining aspects and/or parameters of the action to be performed.

At step 706, a request may be sent to create a workflow based at least in part on the one or more actions determined at step 704. For example, control plane provisioning interface 404 (FIG. 4) may send the request to the workflow component 406. The request to create the workflow may include the action(s), action metadata such as type of action, and/or action parameters. In at least one embodiment, the control plane supervisor 402 and/or the workflow component 406 maintains a job queue for such requests, and workflows are created responsive to new additions to the job queue. At step 708, a workflow and one or more component tasks may be created. For example, the workflow component 406 may analyze the request of step 706 to determine the appropriate workflow and component tasks to create.

At step 710, execution of the component task(s) may be guided in accordance with the workflow. For example, the workflow component 406 (FIG. 4) may activate elements of interfaces of various implementation resources to provision the virtual control plane 226. Alternatively, or in addition, the workflow component 406 may manage bids for execution of the component task(s) by components of the virtual resource provider 206 (FIG. 2). At step 712, it may be determined whether the workflow has finished. For example, the workflow component 406 may determine whether a final task in a sequence of tasks managed by the workflow has completed. If so, a procedure incorporating step 712 may progress to step 714. Otherwise the procedure may return to step 710 for a next task and/or task sequence. Workflows may guide multiple task sequences executing in parallel. In this case, it may be that the workflow is not finished until each of the multiple task sequences completes and/or an explicit workflow finished flag is set by one of the component tasks. At step 714, the sender of the request of step 702 may be informed of result(s) of the action(s).

Figure 8:
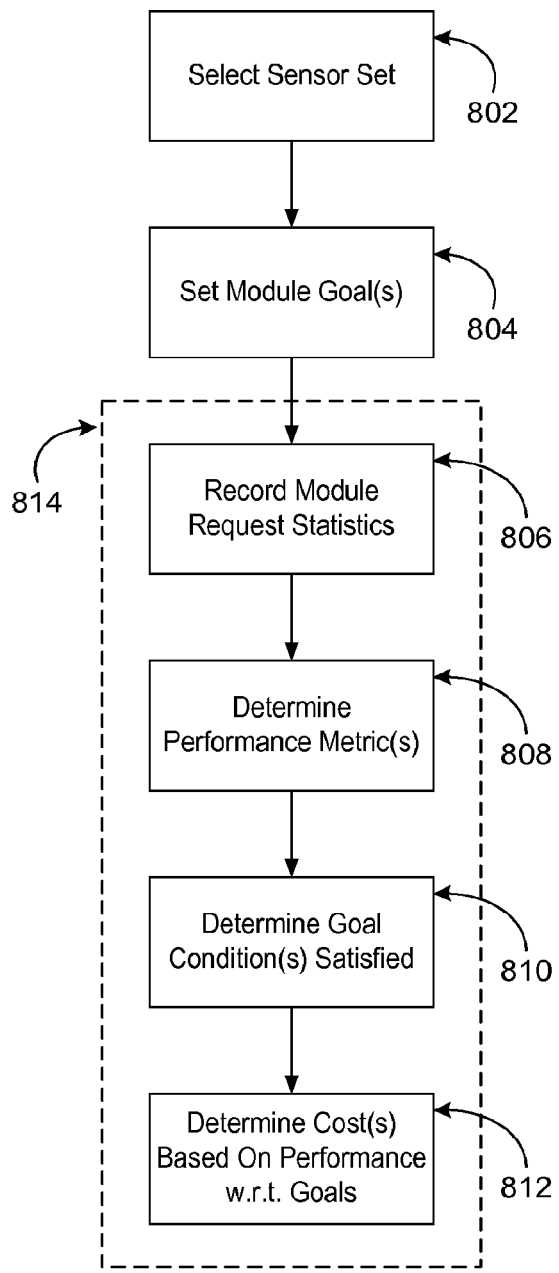
FIG. 8 is a flowchart depicting example steps for cost tracking in accordance with at least one embodiment.

FIG. 8 depicts example steps for tracking costs associated with virtual control planes in accordance with at least one embodiment. At step 802, a set of sensors may be selected and/or configured. For example, an authorized user may select and/or configure one or more implementation resource sensors 320 (FIG. 3) and/or one or more virtual resource sensors 316-318 to provide data to a particular virtual control plane 226 (FIG. 2). Some sensors and/or sensor configurations may be optional and/or consume significant control plane 210 resources, and be capable of enhancing control plane module 322-324 performance with respect to its goals. Step 802 may occur during virtual control plane provisioning and/or throughout the lifetime of an associated virtual control plane. At step 804, one or more control plane module goals may be specified and/or configured. For example, the authorized user may specify and/or configure the control plane module goals with the control plane provisioning interface 404 (FIG. 4). Again, step 804 may occur during virtual control plane provisioning and/or throughout the lifetime of the associated virtual control plane.

Once provisioned, the control plane modules that at least partially implement the virtual control plane 226 (FIG. 2) will begin receiving data from the selected sensors and, in response, begin making resource configuration requests. Different modules may generate different types of resource configuration request and at different rates. For example, a custom control plane module replacing functionality of a default control plane module may improve performance with respect to module goals by generating resource configuration requests at a higher rate than the default control plane module. Tracking associated costs can help moderate request rates. At step 806, control plane module 322-324 (FIG. 3) request statistics may be recorded. For example, the cost tracking component 412 (FIG. 4) may record numbers and rates of requests by request type, requesting module, requesting control plane and/or associated customer.

Control plane module goals may be associated with one or more performance metrics and/or one or more conditions. For example, an auto-scaling module may have a goal of minimizing a number of virtual computer system instances collectively providing a service with a condition that service response latency remains below a specified threshold. At step 808, one or more performance metrics may be determined. For example, the cost tracking component 412 (FIG. 4) may determine the set of performance metrics associated with control plane modules 408 currently participating in the implementation of one or more control planes 210 (FIG. 2), i.e., associated with active control plane modules. Such performance metrics may be determined per module and/or per control plane. At step 810, it may be determined whether one or more goal conditions are satisfied. For example, the cost tracking component 412 may determine satisfaction status for the set of goal conditions associated with active control plane modules.

At step 812, one or more costs associated with active control plane modules may be determined. For example, the cost tracking component 412 (FIG. 4) may determine costs associated with operating control plane modules based on the module request statistics determined at step 806, the performance metric(s) determined at step 808, and/or the goal condition(s) determined at step 810. Costs associated with operating control plane modules and/or virtual control planes may be tracked distinct from costs associated with virtual resources 212 (FIG. 2), and trade-offs may occur between the two. For example, the performance metric(s) may include one or more costs associated with maintaining one or more sets of virtual resources 212, and one or more of the control plane module goals may be to reduce these costs (e.g., relative to some historical baseline and/or to default control plane module performance). A customer responsible for the costs of a virtual control plane and a set of virtual resources benefits if a custom control plane module of the virtual control plane can reduce costs associated with the set of virtual resources more than it increases costs associated with the virtual control plane. The cost tracking component 412 may be configured to determine a cost associated with a particular custom control plane module based at least in part on (e.g., as a weighted sum of) the cost benefit provided by the custom control plane module. For example, the cost tracking component 412 may determine a cost associated with a custom auto-scaling module to be half of the cost reduction for a set of virtual resources in a current time period relative to an agreed-upon prior time period. The cost tracking component 412 may be further configured to penalize (e.g., filter or reduce) performance achievements that don't also satisfy an associated set of goals. For example, low false negative detection rates for unsolicited electronic mail may not be rewarded if it is achieved at the cost of high latency or high false positive detection rates.

Steps 806-812 are shown enclosed in a dashed box 814 to indicate that these steps may be performed periodically, for example, as part of a regular cost determination and/or cost presentation including for the purposes of invoicing and/or billing. Such cost determinations may be made for accounts associated with customers of the virtual resource provider 206 (FIG. 2) including customers that provision virtual resources 212 and/or virtual control planes 210, as well as "third party" vendors of custom control plane modules 324. Costs incurred by third party vendors may be settled with customers independent of the virtual resource provider 206. Alternatively, or in addition, the virtual resource provider 206 may facilitate settlement of such costs. In some cases, one or more customers of the virtual resource provider 206 may allocate one or more amounts to settle costs associated with a service implemented by multiple control plane modules 408 (FIG. 4). In this case, the cost tracking component 412 may distribute such allocations based at least in part on module reputation and/or contribution, for example, as determined by the module reputation tracking component 414 and/or the module contribution tracking component 416.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for operating virtual resources, comprising:
   under control of one or more computer systems configured with executable instructions,
   providing virtual resources provisioned to use physical hardware resources of a virtual resource provider;
   providing a plurality of control planes within the virtual resource provider that perform management of at least some of the virtual resources, each of the default control planes including one or more of a plurality of default control plane modules to perform various management functionalities;
   establishing a custom virtual control plane that replaces one of the default control planes and that performs management of two or more of the virtual resources within the virtual resource provider, the custom virtual control plane being customizable through a control plane provisioning interface for selection of which control plane modules are associated with the custom virtual control plane, so that a user selects which of the control plane modules of the one of the default control planes are replaced with user selected custom control plane modules of the custom virtual control plane that performs management functionalities of the two or more virtual resources;
   receiving data from sensors coupled to the control plane modules of the custom virtual control plane and receiving data from sensors coupled to at least one of the plurality of default control plane modules;
   responsive to data received from the sensors, receiving at least a first resource configuration request from the custom virtual control plane and at least a second resource configuration request from the at least one of the plurality of default control planes, the first and second resource configuration requests specifying competing configurations for a capacity of a virtual resource, which is one of the physical hardware resources of the virtual resource provider, and which is shared by a control plane module of the custom virtual control plane and the at least one of the plurality of default control plane modules;
   mediating the first and second resource configuration requests so as to maintain the resource within its capacity, wherein mediating further includes modifying a resource allocation of the virtual resource to facilitate sharing between the control module of the custom virtual control plane and the at least one of the plurality of default control plane modules.

2. A computer-implemented method according to claim 1, wherein the custom virtual control plane replaces a default control plane implemented at least in part by one or more default control plane modules.

3. A computer-implemented method according to claim 1, wherein the custom virtual control plane is implemented by at least one custom control plane module, which comprises at least one of: a virtual resource capacity auto-scaling module, a virtual resource spread management module, a service request load balancing module, a malicious network traffic detection module, a malicious network traffic mitigation management module, or an unsolicited electronic message filtering module.

4. A computer-implemented method according to claim 1, wherein:
   the first resource configuration request is generated by a first control plane module in the plurality of control plane modules;
   the second resource configuration request is generated by a second control plane module in the plurality of control plane modules; and
   the first and second control plane modules each at least implement a set of duplicate functionality.

5. A computer-implemented method according to claim 1, wherein the first and second resource configuration requests specify competing sizes for the virtual resources.

6. A computer-implemented method according to claim 1, wherein the virtual resources includes at least one of: a virtual machine, a virtual computing system, a virtual computing system cluster, a virtual data store, a virtual file system volume, a virtual network, or a virtual private network.

7. A computer-implemented method according to claim 1, wherein the first and second resource configuration requests specify competing allocations of the resource.

8. A computer-implemented method according to claim 7, wherein the resource includes at least one of: a storage device, a physical server, a server rack, a data center, a network switch, a malicious network traffic mitigation device, a network connection, a wireless network transmitter, and a wireless network receiver.

9. A computer-implemented method according to claim 1, wherein the first and second resource configuration requests specify competing inter-resource network traffic limits.

10. A computer-implemented method according to claim 1, wherein a customer of the virtual resource provider can perform customization of the custom virtual control plane through the control plane provisioning interface.

11. A computer-implemented method for operating virtual resources, comprising:
    under control of one or more computer systems configured with executable instructions,
    receiving a first control plane configuration request associated with a customer of a virtual resource provider, the first control plane configuration request specifying at least a first custom control plane module configured at least to replace functionality of at least one module of a second set of default control plane modules;
    provisioning a virtual control plane of the virtual resource provider with a first set of control plane modules that includes the first custom control plane module such that the virtual control plane comprises default control plane modules and the first custom control plane module, which performs management functions associated with the virtual resource provider and which was selected by the customer of the virtual resource provider, wherein the first set of control plane modules perform similar management functionalities to the second set of default control plane modules;

receiving data from sensors coupled to the first custom control plane module and coupled to the default control plane modules of the virtual control plane and the second set of default control plane modules;

in response to receiving data from the sensors, mediating a first resource configuration request received from the virtual control plane including the first custom control plane module and a second resource configuration request received from the at least one module of the second set of the default control plane modules, the first and second configuration requests specifying competing configurations for a set of virtual resources between the first custom control plane module and the at least one module of the second set of the default control plane modules; and configuring the set of virtual resources so as to facilitate sharing of the set of virtual resources by the first custom control plane module and the at least one module of the second set of default control plane modules.

12. A computer-implemented method according to claim 11, wherein:

the customer of the virtual resource provider is responsible for a set of costs associated with a subset of the virtual resources; and provisioning the virtual control plane comprises at least partially delegating control of the subset of the virtual resources to the first set of control plane modules.

13. A computer-implemented method according to claim 11, further comprising:

receiving a second control plane configuration request specifying at least a second custom control plane module configured at least to replace the first custom control plane module; and re-provisioning the virtual control plane with a second set of control plane modules that includes the second custom control plane module.

14. A computer-implemented method for operating virtual resources, comprising:

providing virtual resources provisioned to use physical hardware resources of a virtual resource provider;

providing a plurality of control planes within the virtual resource provider that perform management of at least some of the virtual resources, each of the control planes include by one or more of a plurality of control plane modules to perform various management functionalities;

receiving data from sensors to a first set of the plurality of control plane modules that at least partially implement a virtual control plane of the virtual resource provider and to a second set of the plurality of control plane modules that at least partially implement at least one other control plane of the virtual resource provider, wherein the first set and the second set of the plurality of control plane modules and at least the first set includes at least one custom control plane module configured to replace functionality of a default control plane module and wherein a customer of the virtual resource provider selects the at least one custom control plane module;

responsive to the data from the sensors, determining that resource configuration requests of the second set include competing configurations for sharing of at least one of the virtual resources;

configuring the at least one virtual resource with at least one mediated configuration determined based at least in part on the competing configurations of the resource configuration requests, by modifying a resource allocation of the at least one virtual resource to facilitate sharing of the at least one of the virtual resources by the at least one custom control plane module of the first set and the control plane module of the second set; and providing at least one service to at least one user with the at least one virtual resource.

15. A computer-implemented method according to claim 14, wherein the sensors include at least one of: an implementation resource status sensor, or an implementation resource capacity utilization sensor.

16. A computer-implemented method according to claim 14, wherein the virtual resources includes at least one virtual machine executing on a host server computer and at least one of the sensors is embedded in said at least one virtual machine.

17. A computer-implemented method according to claim 16, wherein said at least one of the sensors embedded in said at least one virtual machine provides data with respect to at least one of: virtual machine resource status, and virtual machine resource capacity utilization.

18. A computer-implemented method according to claim 16, wherein said at least one virtual machine at least partially implements a computing application, and said at least one of the sensors provides data with respect to a communication protocol in which the computing application participates.

19. A computer-implemented method according to claim 16, wherein said at least one virtual machine at least partially implements a computing application, and said at least one of the sensors provides data with respect to an activity history generated by the computing application.

* * * * *